(12) United States Patent
Mongold et al.

(10) Patent No.: US 9,419,354 B2
(45) Date of Patent: Aug. 16, 2016

(54) ELECTRICAL CONTACTS, FUSIBLE MEMBERS, AND METHODS OF ATTACHING ELECTRICAL CONTACTS TO SUBSTRATES

(71) Applicant: Samtec, Inc., New Albany, IN (US)

(72) Inventors: John Allen Mongold, Todd, PA (US); Donald Christopher Knowlden, Harrisburg, PA (US); William Chieng Ouyang, New Albany, IN (US)

(73) Assignee: SAMTEC, INC., New Albany, IN (US)

( * ) Notice: Subject to any disclaimer, the term of this patent is extended or adjusted under 35 U.S.C. 154(b) by 61 days.

(21) Appl. No.: 14/190,239

(22) Filed: Feb. 26, 2014

(65) Prior Publication Data
US 2015/0244088 A1    Aug. 27, 2015

(51) Int. Cl.
| | |
|---|---|
| H01R 4/02 | (2006.01) |
| H01R 12/57 | (2011.01) |
| B23K 1/00 | (2006.01) |
| B23K 1/008 | (2006.01) |
| B23K 1/19 | (2006.01) |
| H01R 13/04 | (2006.01) |
| H01R 43/02 | (2006.01) |

(52) U.S. Cl.
CPC ............ H01R 12/57 (2013.01); B23K 1/008 (2013.01); B23K 1/0016 (2013.01); B23K 1/19 (2013.01); H01R 4/024 (2013.01); B23K 2201/42 (2013.01); B23K 2203/08 (2013.01); B23K 2203/12 (2013.01); B23K 2203/18 (2013.01); H01R 13/04 (2013.01); H01R 43/0256 (2013.01)

(58) Field of Classification Search
CPC ...................................... H01R 12/57
USPC ............... 439/876, 83, 874; 29/843, 874, 29/876–879
See application file for complete search history.

(56) References Cited

U.S. PATENT DOCUMENTS

| | | | |
|---|---|---|---|
| 5,411,236 A | 5/1995 | Morita et al. | |
| 7,695,329 B2 | 4/2010 | Peloza et al. | |
| 7,837,522 B1 * | 11/2010 | Hoover | H01R 9/091 29/843 |
| 8,167,629 B2 * | 5/2012 | Ito | H01R 12/70 439/736 |
| 8,187,009 B2 * | 5/2012 | Liao | H01R 12/57 439/83 |
| 2010/0216322 A1 | 8/2010 | Fan | |
| 2011/0008979 A1 | 1/2011 | Yeh et al. | |
| 2012/0252274 A1 | 10/2012 | Ju | |
| 2014/0179173 A1 | 6/2014 | Suzuki et al. | |

FOREIGN PATENT DOCUMENTS

JP    2013-48060 A    3/2013

OTHER PUBLICATIONS

Official Communication issued in corresponding International Application PCT/US2014/067286, mailed on Feb. 27, 2015.

* cited by examiner

*Primary Examiner* — Phuongchi T Nguyen
(74) *Attorney, Agent, or Firm* — Keating & Bennett, LLP

(57) ABSTRACT

A contact includes a body section, a tail section arranged at a lower portion of the body section, a peg extending from the tail section such that the peg projects from a front surface of the contact, and a fusible member attached to the contact such that the peg protrudes into the fusible member. A lower portion of the fusible member is offset from a main portion of the fusible member.

11 Claims, 22 Drawing Sheets

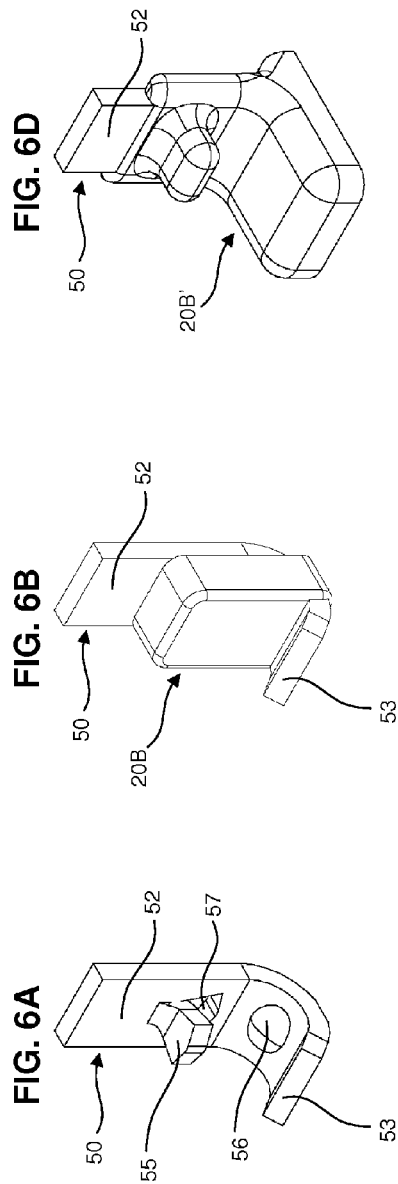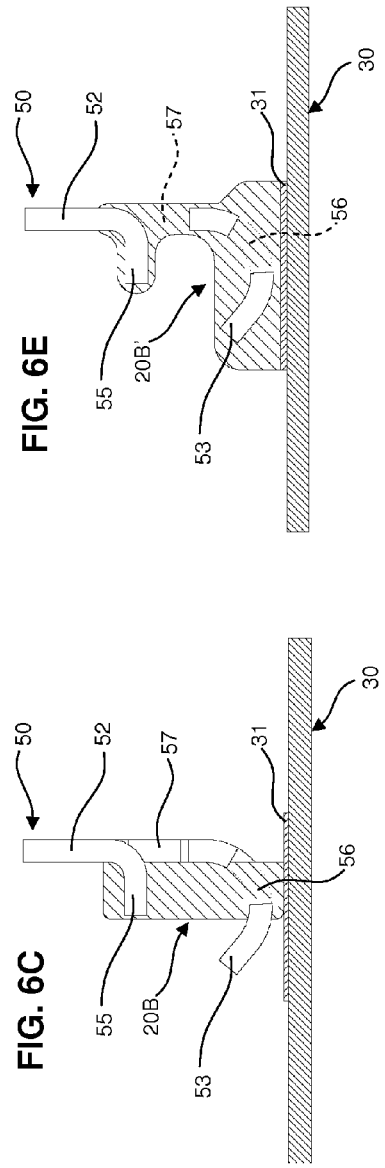

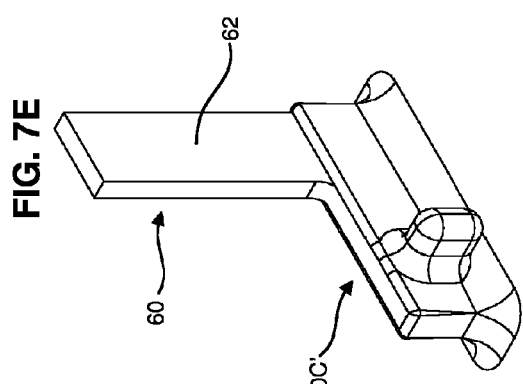
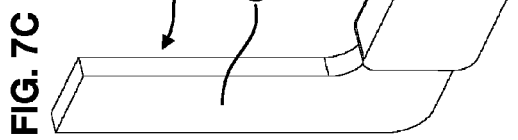
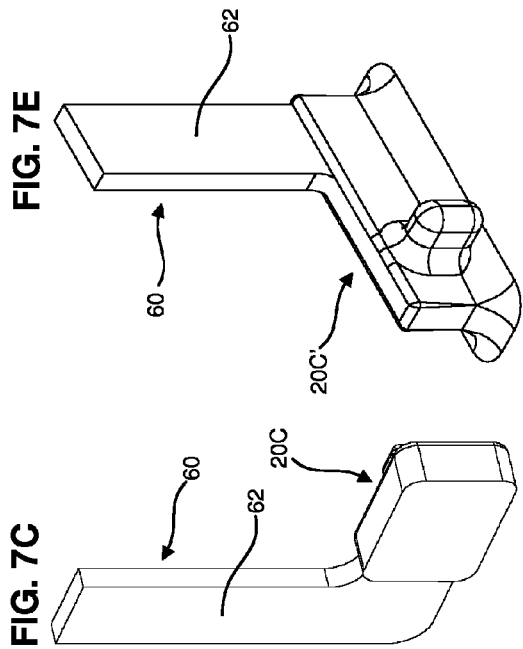
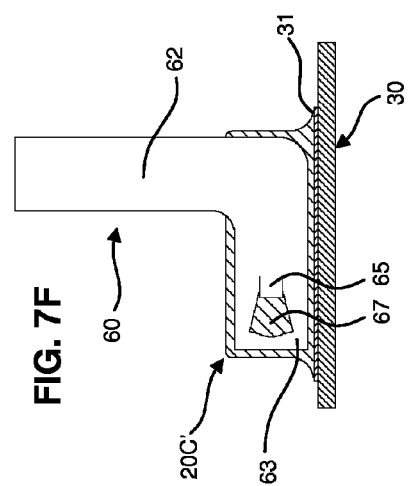
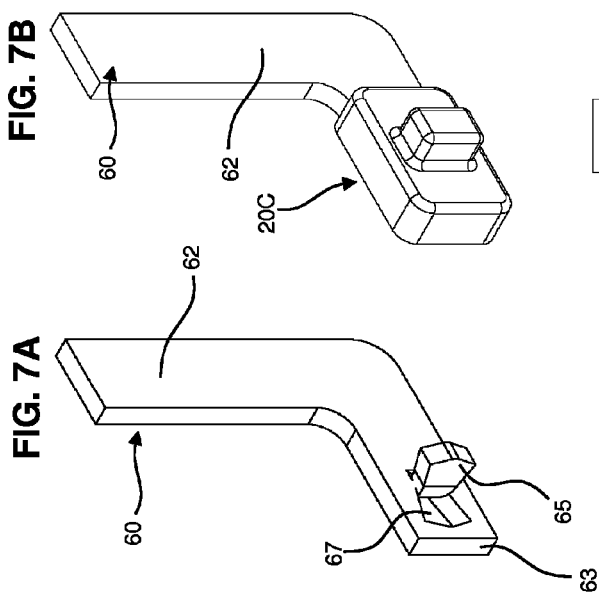
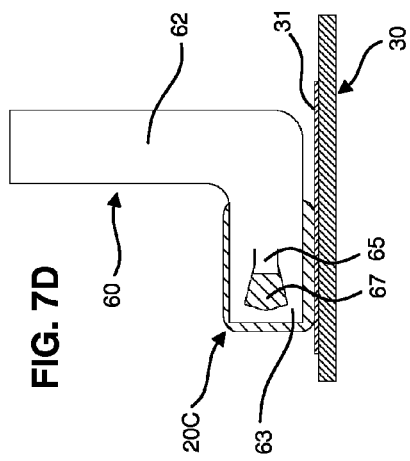

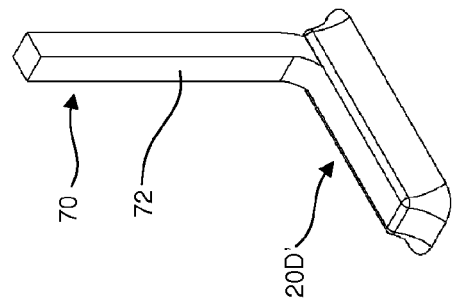
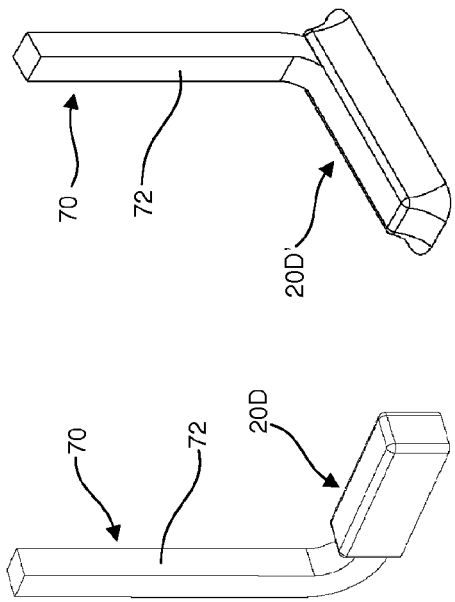
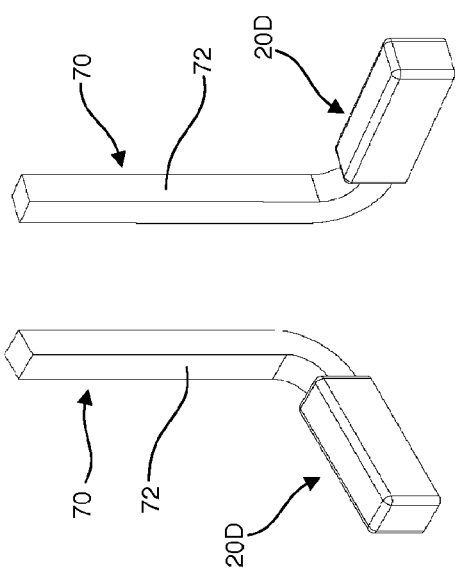
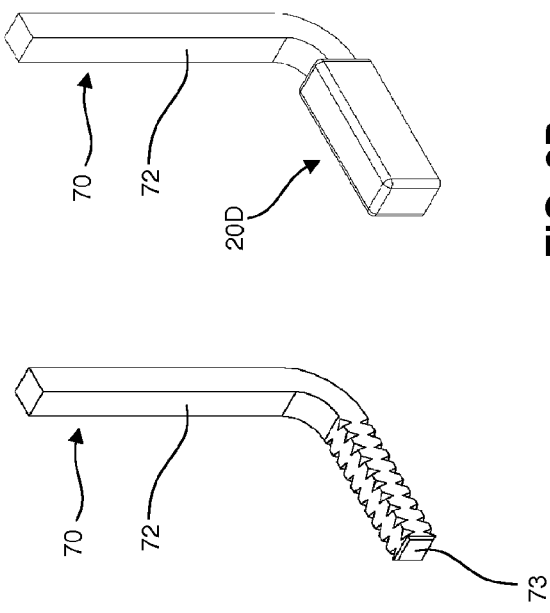
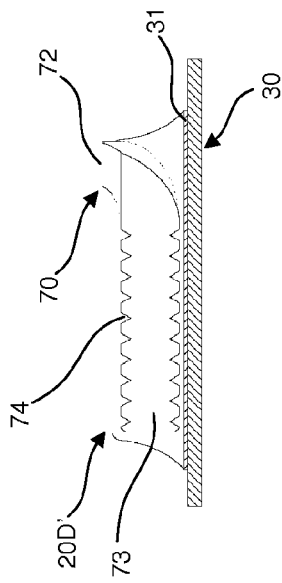
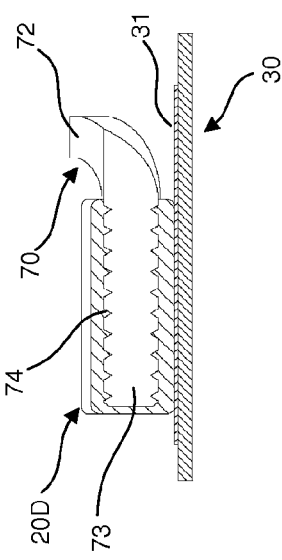

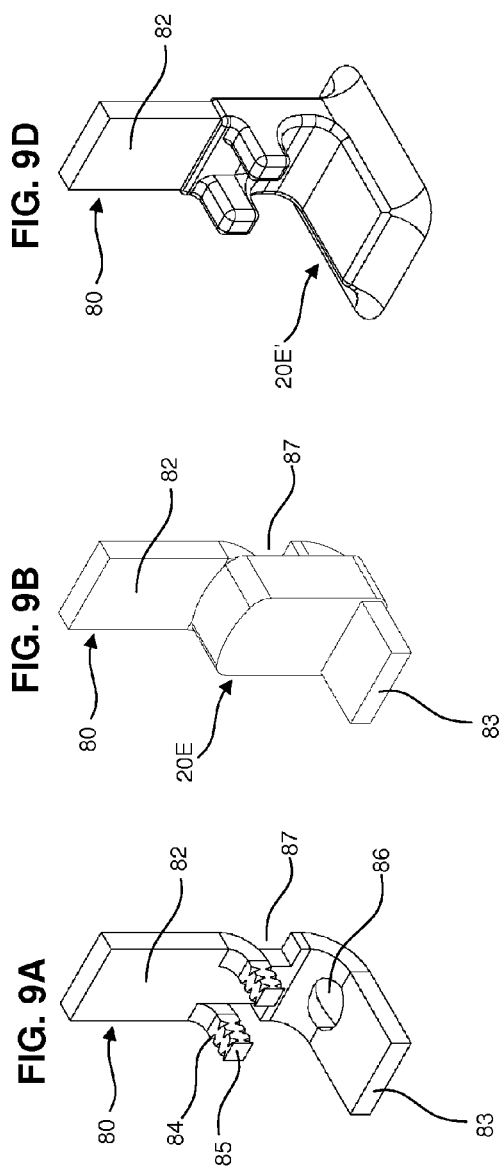
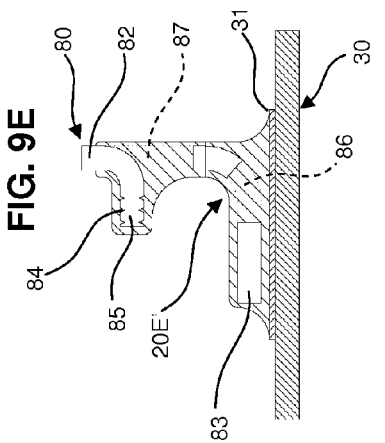
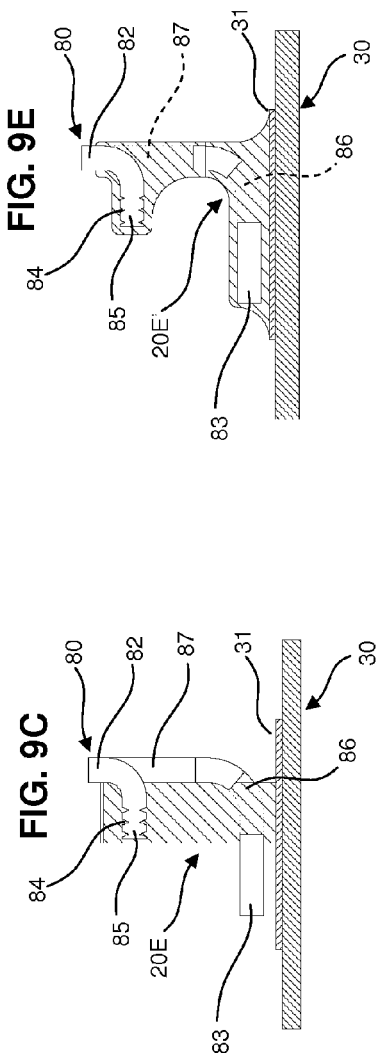
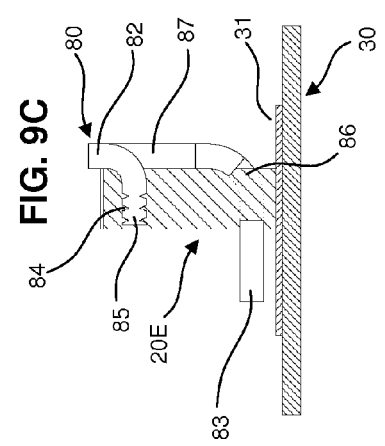

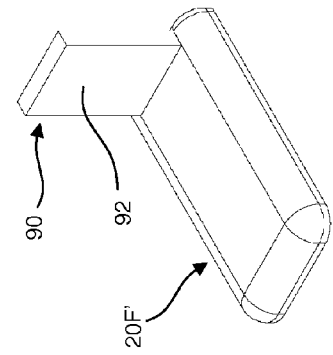
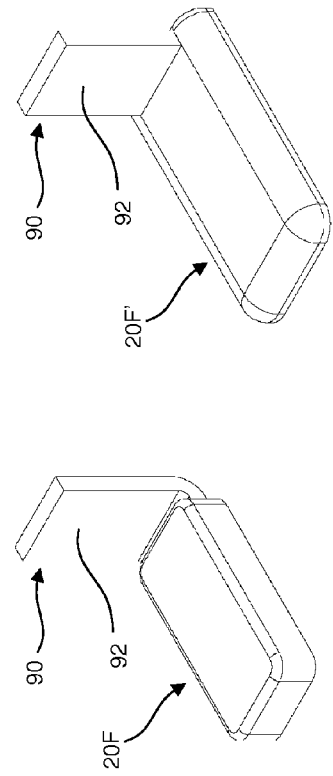
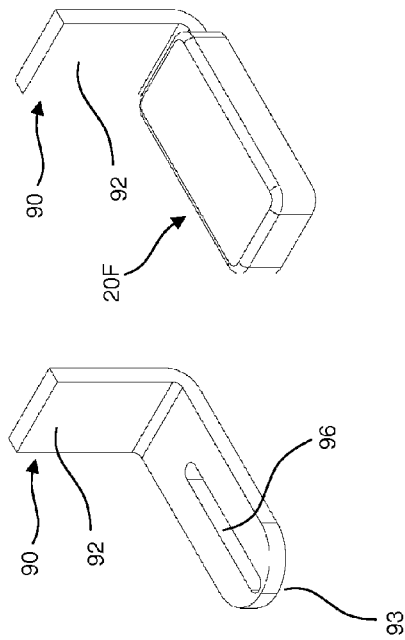
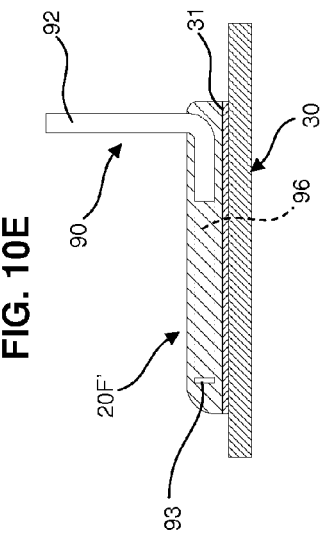
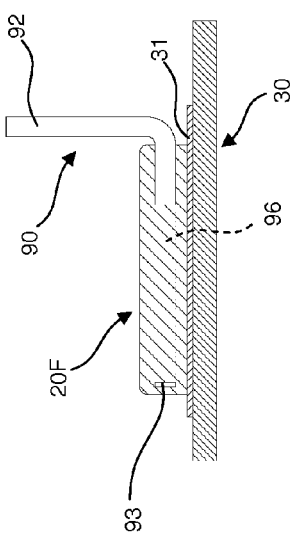

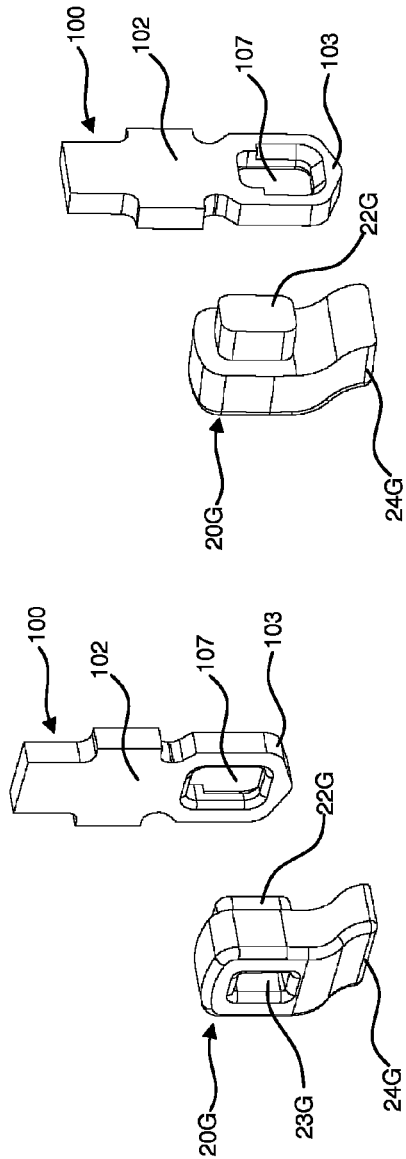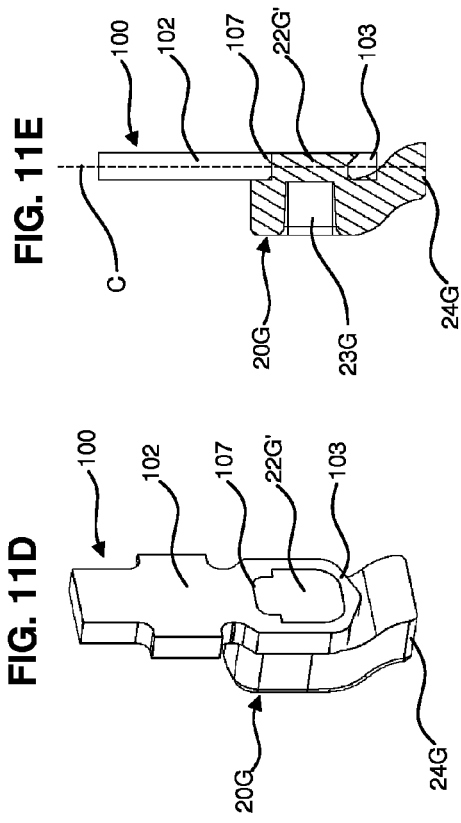

ELECTRICAL CONTACTS, FUSIBLE MEMBERS, AND METHODS OF ATTACHING ELECTRICAL CONTACTS TO SUBSTRATES

BACKGROUND OF THE INVENTION

1. Field of the Invention

The present invention relates to contacts of electrical connectors. More specifically, the present invention relates to fusible members and the contacts for connecting electrical connectors to substrates.

2. Description of the Related Art

Electrical connectors are used to place electrical devices in communication with one another, for example, to connect an electrical device or cable to a circuit board. A typical connector includes one or more contacts that electrically and mechanically connect the connector to one or more corresponding pads of a circuit board. The electrical and mechanical connection between a contact and a pad is typically provided by a fusible material, such as solder.

U.S. Pat. No. 7,837,522 discloses a method of attaching solder to a contact. FIGS. 14A-14C show a contact 210 and a solder member 220. As shown in FIG. 14A, the contact 210 includes a tail section 213 extending from the bottom of a body section 212. A peg 215 is cut or stamped from the tail section 213 of the contact 210 and protrudes from a front surface 210A of the contact 210. As shown in FIG. 14C, the solder member 220 includes a depression 222 that is formed by the peg 215 of the contact 210 pressing into the solder member 220 when the solder member 220 is attached to the contact 210.

As shown in FIGS. 14B and 14C, the solder member 220 is located only on the front surface 210A of the contact 210 when the solder member 220 is attached to the contact 210. Accordingly, when the solder member 220 is reflowed (i.e., melted) to attach to the contact 210 to a pad of a circuit board, the solder of the solder member 220 predominantly remains at the front surface 210A of the contact 210. Thus, because a low proportion of the solder flows to a rear surface 210B of the contact 210, the electrical and mechanical connection between the contact 210 to the pad of the circuit board is weaker at the rear surface 210B as compared to the front surface 210A. As a result, the connection between the contact 210 and the pad of the circuit board is more likely to break than if the solder of the solder member 220 was more evenly distributed between the front surface 210A and the rear surface 210B of the solder member 220.

Further, when the contact 210 is attached to the pad of the circuit board, the optimal location for the tail section 213 of the contact 210 is centered with respect to the pad of the circuit board. However, since the solder member 220 is attached only at the front surface 210A of the contact 210, the solder member 220 is offset from the center of the pad of the circuit board. Accordingly, the pad of the circuit board must have a large surface area to accommodate the bottom surfaces of both the solder member 220 and the tail section 213 of the contact 210.

SUMMARY OF THE INVENTION

To overcome the problems described above, preferred embodiments of the present invention provide contacts with a fusible member that can provide a suitable connection to a substrate (e.g., a printed circuit board, a printed wiring board, an electronic component board, etc.), that is securely attached to the contacts, that readily flows to the surfaces of the contacts, and that is offset so that a lower portion of the fusible member is located underneath the contact.

A contact according to a preferred embodiment of the present invention includes a body section, a tail section arranged at a lower portion of the body section, a peg extending from the tail section such that the peg projects from a front surface of the contact, and a fusible member attached to the contact such that the peg protrudes into the fusible member. A lower portion of the fusible member is offset from a main portion of the fusible member.

The contact further preferably includes a slot in the tail section that is adjacent to the peg. The peg preferably widens with increasing distance from the front surface of the contact. A plane defined by the front surface of the contact preferably intersects the lower portion of the fusible member. A lowermost surface of the lower portion of the fusible member is preferably located underneath a lowermost surface of the contact. At least a portion of a lowermost surface of the lower portion of the fusible member preferably extends below a lowermost surface of the contact.

A contact according to a preferred embodiment of the present invention includes a body section, a tail section arranged at a lower portion of the body section, a peg extending from a front surface of the body section or a front surface of the tail section, and a fusible member attached to the contact. The peg protrudes into the fusible member, and the tail section is angled with respect to the body section.

The front surface of the tail section is perpendicular or substantially perpendicular to the body section. The front surface of the tail section is preferably coplanar or approximately coplanar with the body section. The tail section preferably has a curved shape. Preferably the tail section includes a hole, and the fusible member is arranged to at least partially extend into the hole. At least one notch preferably is located in the peg and engages with the fusible member.

A contact according a preferred embodiment a body section, a tail section arranged at a lower portion of the body section, and a fusible member attached to the tail section of the contact such that the fusible member extends from a front surface of the contact to a rear surface of the contact. A hole extends along the tail section, and the fusible member is attached to the contact such that the fusible member at least partially overlaps with the hole.

A connector system according to a preferred embodiment of the present invention includes a substrate and a connector connected to the substrate and including a contact as described above.

A method of attaching a contact to a pad of a substrate according a preferred embodiment of the present invention includes providing the contact including a tail section extending from a body section, attaching a fusible member to the tail section of the contact, the fusible member including an offset section, arranging the contact over the pad of the substrate such that at least a portion of the offset section of the fusible member is located between a lower surface of the contact and the pad of the substrate, and fusing the fusible member to the contact and the pad of the substrate.

The fusible member is preferably shaped to form the offset section after the fusible member is attached to the tail section of the contact. The fusible member is preferably shaped to form the offset section before the fusible member is attached to the tail section of the contact. Preferably, the contact includes a peg extending from the tail section such that the peg projects from a front surface of the contact, and in the step of attaching the fusible member to the tail section of the contact, the contact and the fusible member are arranged such that the peg penetrates into the fusible member. In the step of fusing the fusible member, the fusible member preferably flows to all sides of the tail section of the contact.

The above and other features, elements, characteristics and advantages of the present invention will become more apparent from the following detailed description of preferred embodiments of the present invention with reference to the attached drawings.

BRIEF DESCRIPTION OF THE DRAWINGS

FIGS. 6A-6E are perspective and cross-sectional views of another contact and another fusible member according to a preferred embodiment of the present invention.

FIGS. 7A-7F are perspective and cross-sectional views of another contact and another fusible member according to a preferred embodiment of the present invention.

FIGS. 8A-8F are perspective and cross-sectional views of another contact and another fusible member according to a preferred embodiment of the present invention.

FIGS. 9A-9E are perspective and cross-sectional views of another contact and another fusible member according to a preferred embodiment of the present invention.

FIGS. 10A-10E are perspective and cross-sectional views of another contact and another fusible member according to a preferred embodiment of the present invention.

FIGS. 11A-11E are perspective and cross-sectional views of another contact and another fusible member according to a preferred embodiment of the present invention.

DETAILED DESCRIPTION OF PREFERRED EMBODIMENTS

Preferred embodiments of the present invention will now be described in detail with reference to FIGS. 1A to 13E. Note that the following description is in all aspects illustrative and not restrictive and should not be construed to restrict the applications or uses of the present invention in any manner.

Figure 1A:
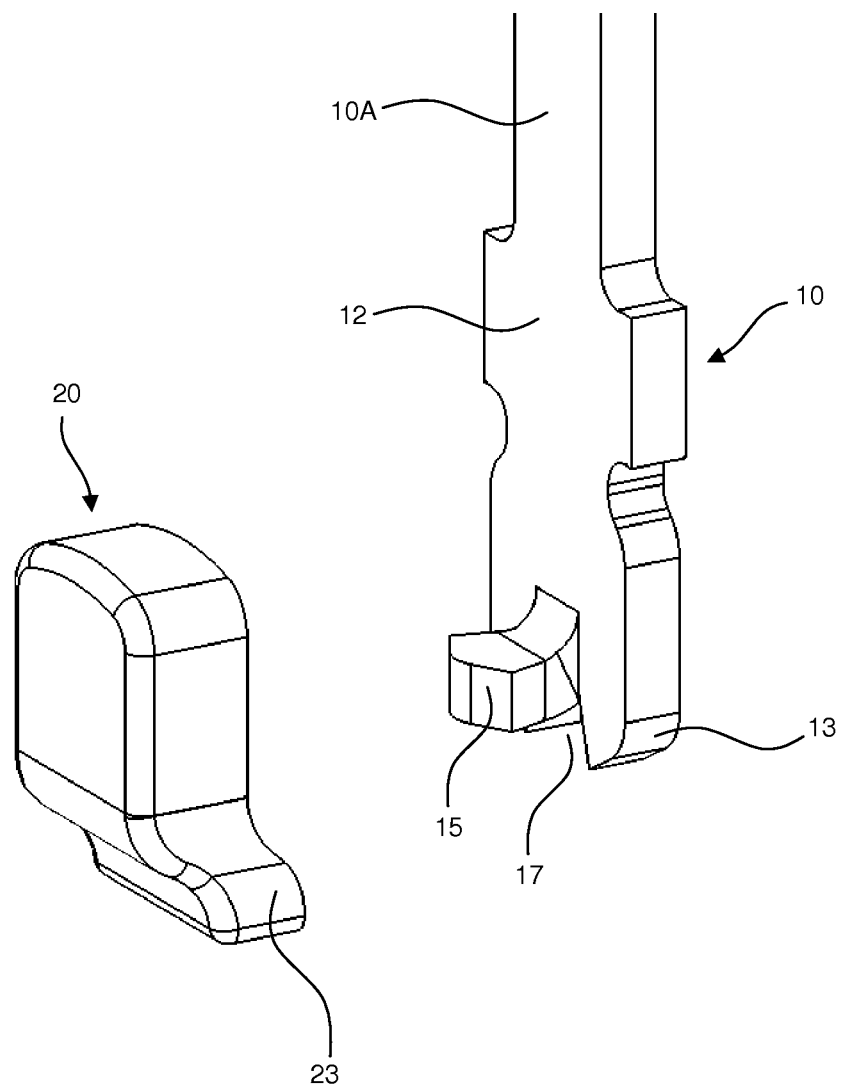
FIGS. 1A and 1B are front and rear perspective views of a contact and a fusible member according to a preferred embodiment of the present invention.
Figure 4A:
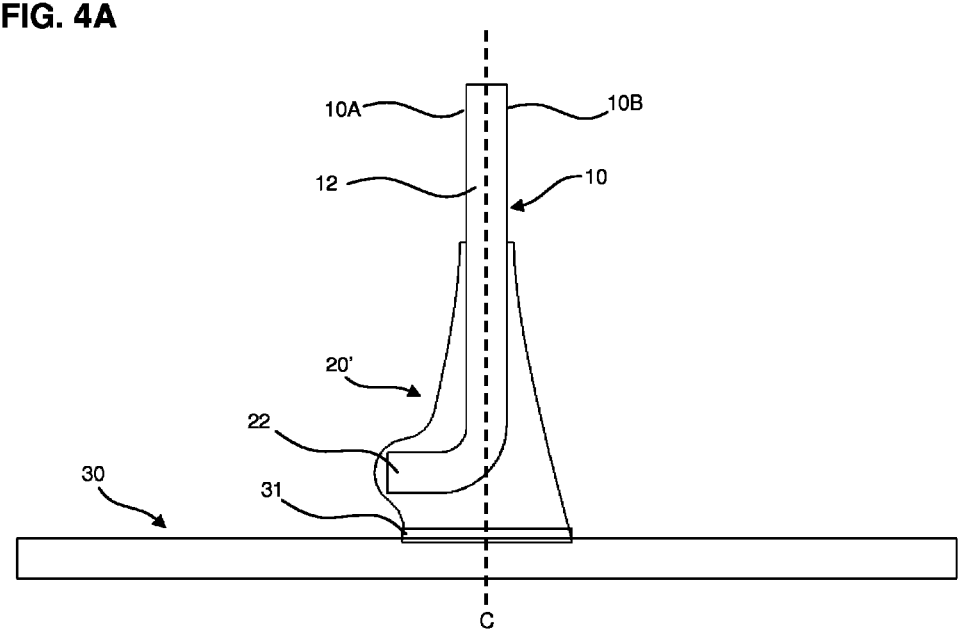
FIGS. 4A and 4B are side and rear cross-sectional views of the contact and the fusible member of FIGS. 1A and 1B arranged on the pad of the substrate of FIG. 3A after the fusible member is melted, flowed, and then re-solidified.
Figure 4B:
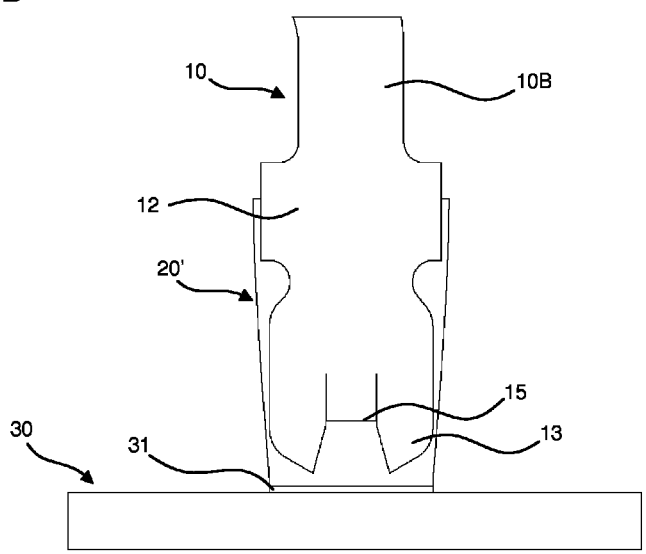
Figure 4C:
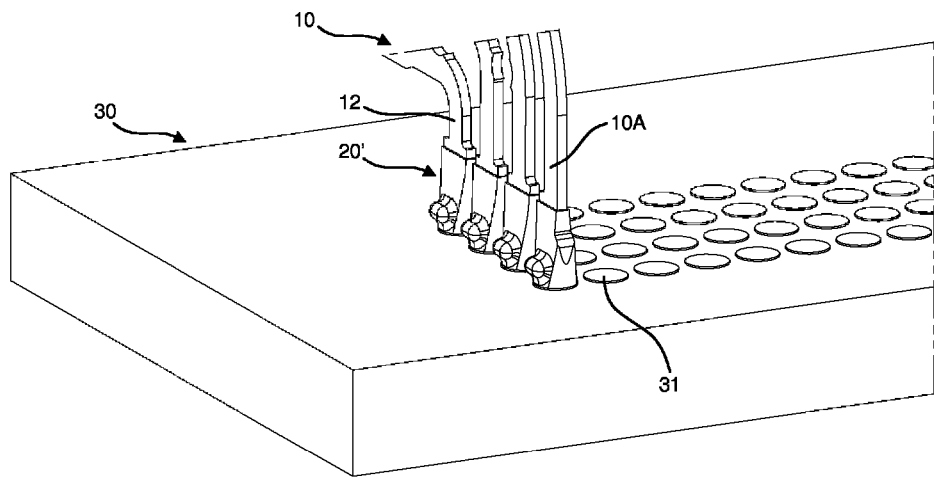
FIGS. 4C and 4D are front and rear perspective views of the contacts, fusible members, and substrate of FIGS. 3A and 3B after the fusible member is melted, flowed, and then re-solidified.
Figure 4D:
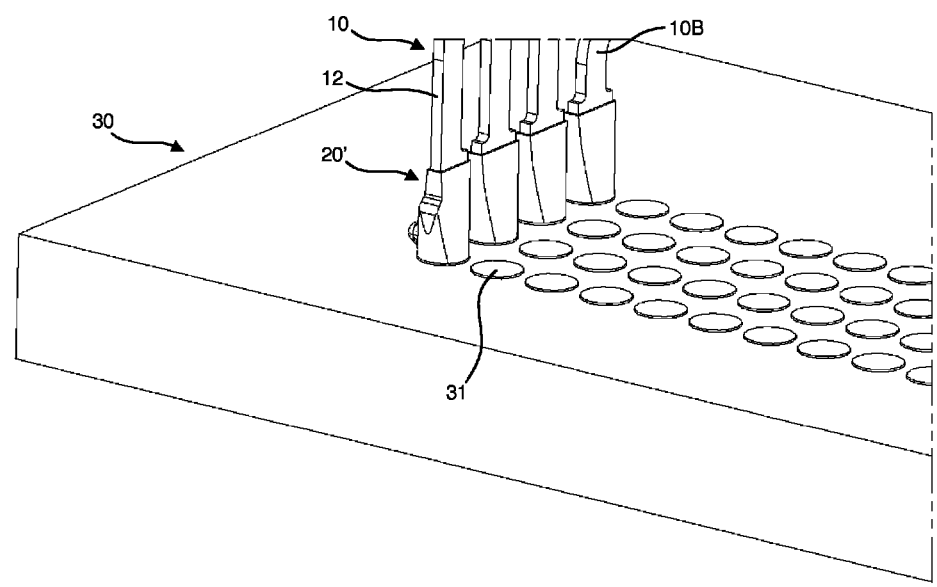

FIGS. 1A to 4D show a contact 10 and a fusible member 20 in accordance with a preferred embodiment of the present invention. FIGS. 1A and 1B are, respectively, front and rear perspective views of the contact 10 and the fusible member 20. FIGS. 2A and 2B are, respectively, a rear perspective view and a cross-sectional view of the fusible member 20 attached to the contact 10. FIG. 3A is a side view of the contact 10 and the fusible member 20 arranged on a pad 31 of a substrate 30. FIGS. 3B and 3C are, respectively, front and rear perspective views of a plurality of contacts 10 and fusible members 20 arranged on the substrate 30. FIGS. 4A and 4B are side and rear cross-sectional views of the contact 10 and the fusible member 20 arranged on the pad 31 of the substrate 30 after the fusible material 20' has melted, flowed, and then re-solidified. FIGS. 4C and 4D are front and rear perspective views of the contacts 10, fusible members 20, and substrate 30 of FIGS. 3A and 3B after the fusible material 20' has melted, flowed, and then re-solidified.

Figure 1B:
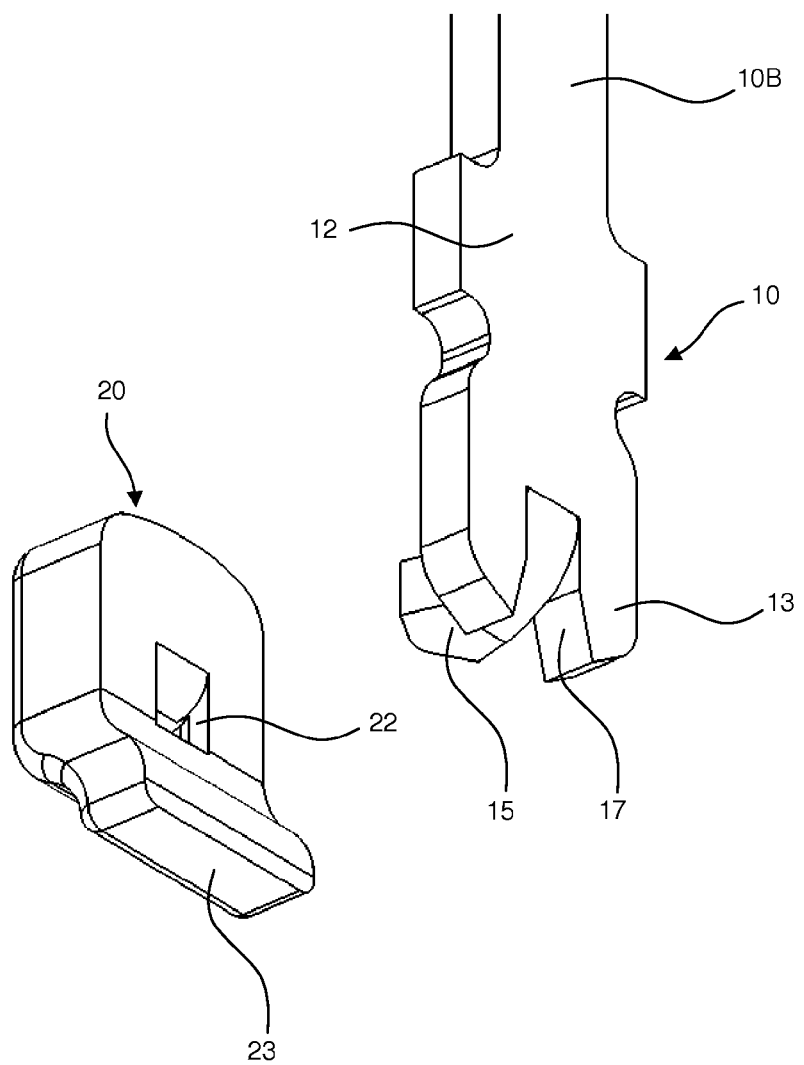
Figure 2A:
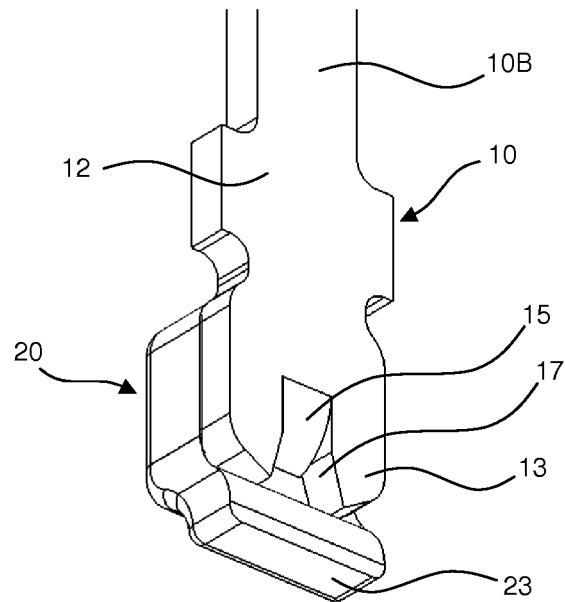
FIGS. 2A and 2B are a rear perspective view and a cross-sectional view of the fusible member of FIGS. 1A and 1B attached to the contact of FIGS. 1A and 1B.
Figure 2B:
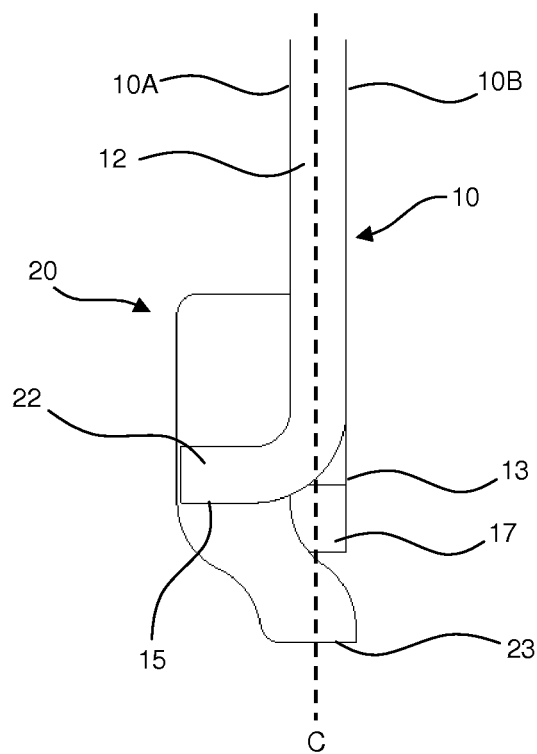
Figure 3A:
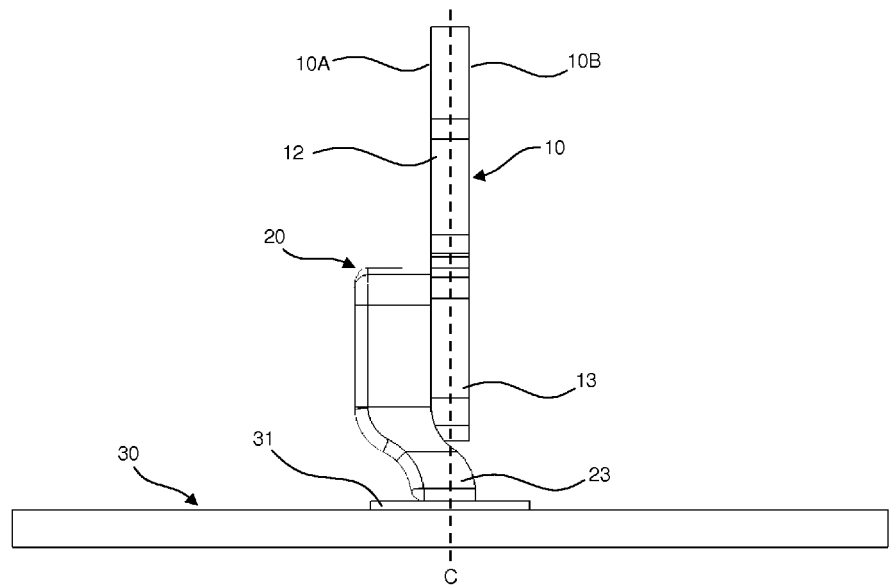
FIG. 3A is a side view of the contact and the fusible member of FIGS. 1A and 1B arranged on a pad of a substrate.
Figure 3B:
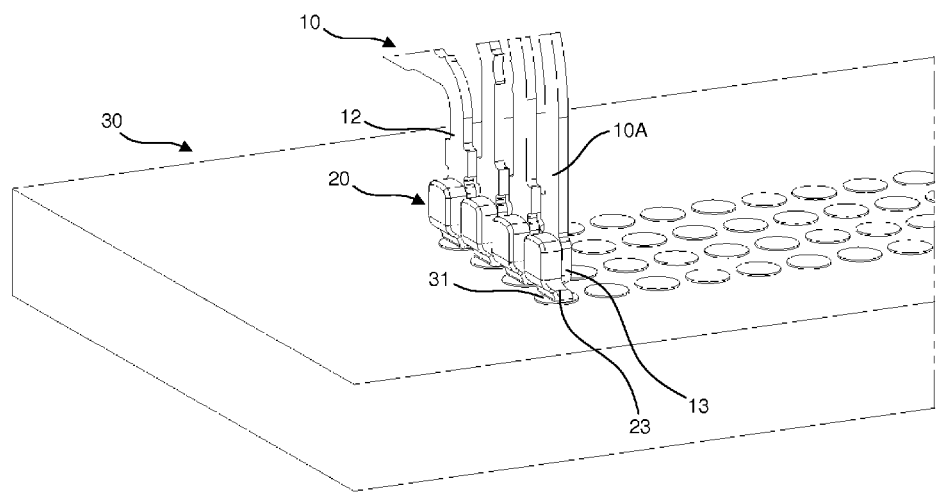
FIGS. 3B and 3C are front and rear perspective views of a plurality of the contacts and fusible members of FIGS. 1A and 1B arranged on the substrate.
Figure 3C:
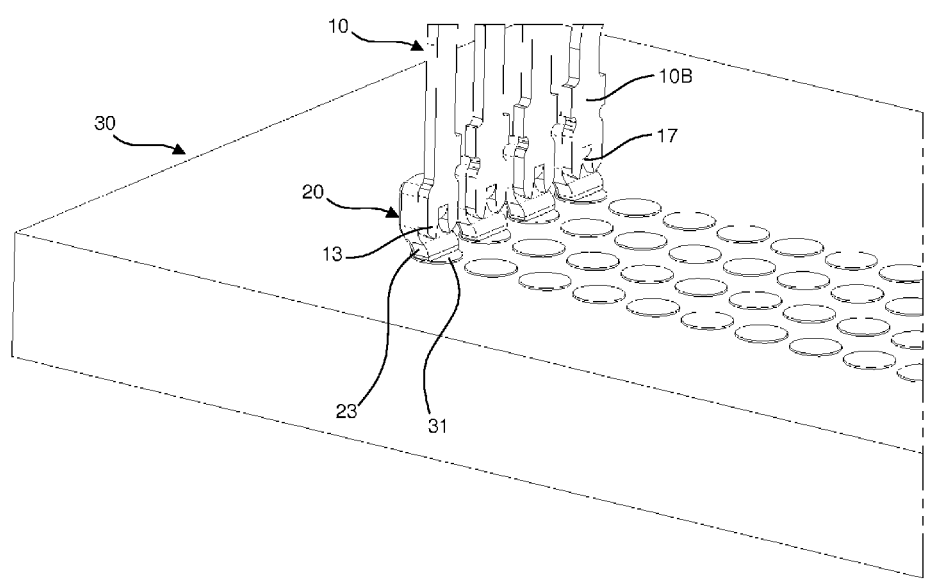

As shown in FIG. 1A, the contact 10 includes a tail section 13 extending from the bottom of a body section 12. A peg 15 is cut or stamped from the tail section 13 of the contact 10 and protrudes from a front surface 10A of the contact 10. As shown in FIG. 1B, the fusible member 20 includes a depression 22. Accordingly, when the fusible member 20 is attached to the contact 10, the peg 15 of the contact 10 preferably forms and engages the depression 22 of the fusible member 20 to secure the fusible member 20 to the contact 10. The depression 22 is preferably formed by the peg 15 of the contact 10 pressing into the fusible member 20 when the fusible member 20 is attached to the contact 10. However, the depression 22 may be formed in the fusible member 20 before the fusible member 20 is attached to the contact 10. Preferably, the peg 15 of the contact 10 at least partially widens with increasing distance from the front surface 10A of the contact 10 to help secure the fusible member 20 to the contact 10 and prevent accidental disengagement of the contact 10 and the fusible member 20 prior to melting the fusible member 20 (for example, during manufacture, shipping, etc.). A slot 17 in the tail section 13 is formed as a result of the cutting or stamping of the peg 15.

As shown in FIGS. 1A to 3C, a bottom section 23 of the fusible member 20 is offset from a main portion of the fusible member 20. Preferably, the bottom section of the fusible member 20 is offset from the main portion of the fusible member 20 after the fusible member 20 has been attached to the contact 10. Accordingly, as shown in FIG. 2B, at least a portion of the bottom section 23 of the fusible member 20 is preferably located underneath the contact 10 and intersects with the centerline C of the tail section 13 of the contact 10, where the centerline C is a vertical line through the tail section 13 equidistant from the front 10A and rear 10B surfaces of the contact 10. Thus, both the bottom section 23 of the fusible member 20 and the tail section 13 of the contact 10 can be located in close proximity to the center of the pad 31 of the substrate 30. More specifically, the bottom section 23 of the fusible member 20 and the contact 10 are preferably aligned with a centerline of the pad 31 that extends perpendicular to the upper surface of the substrate 30 through the center of the pad 31. It is more preferable that the contact 10 be aligned with the center of the pad 31 than the bottom section 23 of the fusible member 20 be aligned with the center of the pad 31; however, it is possible for the bottom section 23 of the fusible member 20 be aligned with the center of the pad 31 while the contact 10 is not aligned with the center of the pad 31.

Accordingly, the tail section 13 of the contact 10, the bottom section 23 of the fusible member 20, and the pad 31 of the substrate 30 are all aligned when the contact 10 is to be attached to the substrate 30, as shown in FIGS. 2B to 3C.

Thus, when the fusible member 20 is melted to secure the contact 10 to the pad 31 of the substrate 30, the fusible material 20' readily flows to both the front surface 10A and a rear surface 10B of the contact 10, as shown in FIGS. 4A to 4D. The slot 17 also allows the fusible material 20' to readily flow to the rear surface 10B of the contact 10. Because of the increased flow of fusible material 20' to the rear surface 10B of the contact 10, a suitable electrical and mechanical connection between the contact 10 and the pad 31 of the substrate 30 is obtained.

Further, because the tail section 13 of the contact 10 and the bottom section 23 of the fusible member 20 are aligned (i.e., centered) with respect to each other, the pad 31 of the substrate 30 is able to have a small surface area. Additionally, the curve on the bottom section 23 of the fusible member 20 allows adjacent contacts 10 to have a narrow pitch, for example 0.100 inch or 0.5 mm, without fusible material 20' bleeding onto adjacent pads 31 of the substrate 30.

According to a preferred embodiment of the present invention, the slot 17 may alternatively be formed as a hole, such that the contact 10 has a closed form at the bottom of the tail section 13. Forming the slot 17 as a hole helps compensate for manufacturing tolerances of the contact 10 and the fusible member 20 by preventing the ends of the tail section 13 from bending or twisting. Also, if the slot 17 is formed as a hole, the flow of fusible material to the rear surface 10B of the contact 10 can be reduced.

Figure 5A:
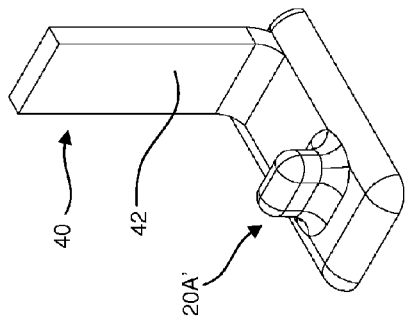
FIGS. 5A-5E are perspective and cross-sectional views of another contact and another fusible member according to a preferred embodiment of the present invention.
Figure 5B:
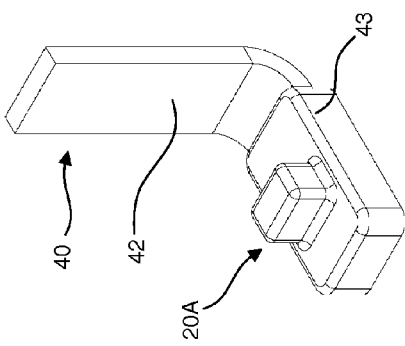
Figure 5C:
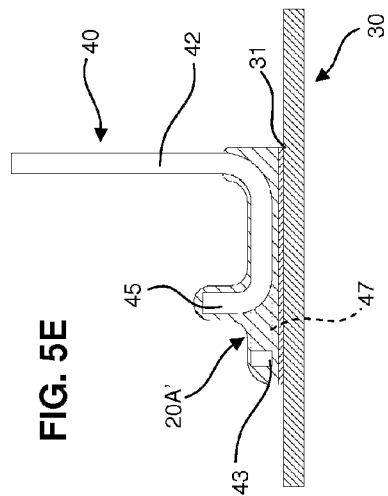
Figure 5D:
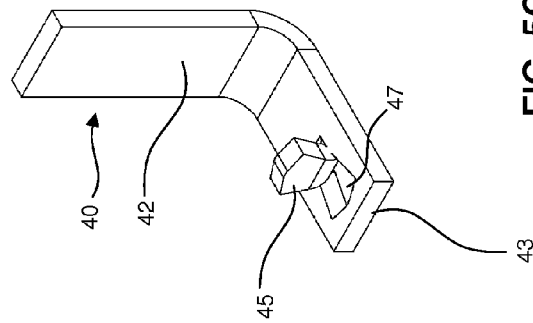
Figure 5E:
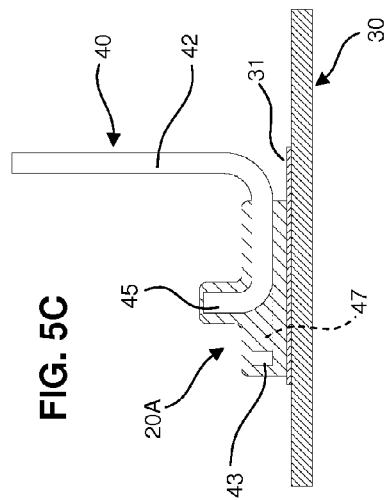

FIGS. 5A and 5B show a contact 40 and a fusible member 20A according to a preferred embodiment of the present invention. FIG. 5C is a cross-sectional view of the contact 40 and the fusible member 20A arranged on the substrate 30. FIGS. 5D and 5E show fusible material 20A' after being melted, flowed, and then re-solidified.

As shown in FIG. 5A, the contact 40 includes a tail section 43 extending from the bottom of a body section 42. The tail section 43 is angled with respect to the body section 42. Preferably, the tail section 43 is perpendicular or substantially perpendicular to the body section 42. As used in this specification, substantially refers to a dimension or orientation within manufacturing tolerances so that substantially perpendicular means perpendicular within manufacturing tolerances and so that substantially parallel means parallel within manufacturing tolerances, for example. A peg 45 is cut or stamped from the tail section 43 of the contact 40 and extends parallel or substantially parallel to the body section 42. Accordingly, when the fusible member 20A is attached to the tail section 43 of the contact 40 as shown in FIG. 5B, the peg 45 secures the fusible member 20A to the contact 40 as shown in FIG. 5C. A hole 47 in the tail section 43 is formed as a result of the cutting or stamping of the peg 45.

As shown in FIG. 5C, the lowermost surface of fusible member 20A is located below the lowermost surface of the contact 40. Accordingly, when the fusible member 20A is melted, the fusible material 20A' readily flows along the lowermost surface of the contact 40 to provide a suitable electrical and mechanical connection between the contact 40 and the pad 31 of the substrate 30, as shown in FIGS. 5D and 5E. The hole 47 also allows the fusible material 20A' to readily flow to the rear surface of the contact 40.

Prior to melting the fusible member 20A, there is preferably a small gap between the bottom of the contact 40 and the pad 31 of the substrate 30 that is caused by the lowermost surface of fusible member 20A being located below the lowermost surface of the contact 40, as shown in FIG. 5C. Accordingly, this small gap promotes the flow of fusible member 20A' along the lowermost surface of the contact 40, as shown in FIG. 5E. Preferably, the small gap has a height of about 0.007" prior to the fusible member 20A being melted and a height of about 0.002" after the fusible material 20A' is re-solidified to promote capillary action of the fusible material 20A' along the lowermost surface of the contact 40. Preferably, the contact 40 is in close proximity to the pad 31 of the substrate 30 after the fusible material 20A' is re-solidified to ensure a suitable electrical connection between the contact 40 and the pad 31.

Figure 13A:
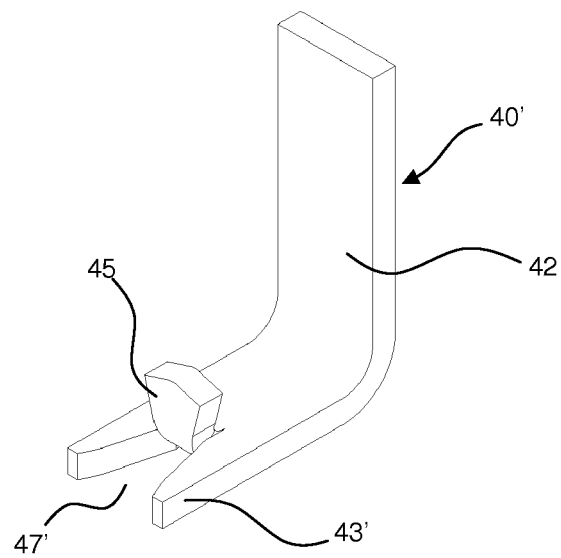
FIGS. 13A-13E show modifications of the contacts shown in FIGS. 5A, 6A, 7A, and 9A, according to preferred embodiments of the present invention.

Further, according to a preferred embodiment of the present invention, the hole 47 of the contact 40 may be alternatively formed as a slot 47', as shown in FIG. 13A. The slot 47' provides an open form at the bottom of the tail section 43' of the modified contact 40', which can increase the flow of the fusible material 20A' to the lowermost surface of the contact 40'.

FIGS. 6A and 6B show a contact 50 and a fusible member 20B according to a preferred embodiment of the present invention. FIG. 6C is a cross-sectional view of the contact 50 and the fusible member 20B arranged on the substrate 30. FIGS. 6D and 6E show fusible material 20B' after being melted, flowed, and then re-solidified.

As shown in FIG. 6A, the contact 50 includes a tail section 53 extending from the bottom of a body section 52. As shown in FIGS. 6A and 6C, the tail section 53 preferably is curved continuously to the end of the contact 50. As shown in FIGS. 6A and 6C, a peg 55 is cut or stamped from a lower portion of the body section 52 of the contact 50 and extends perpendicular or substantially perpendicular from the surface of the body section 55. As also shown in FIGS. 6A and 6C, a hole 56 is cut or stamped from the tail section 53 of the contact 50 at or near the lowermost surface of the contact 50. Accordingly, when the fusible member 20B is attached to the contact 50 as shown in FIG. 6B, the peg 55 secures the fusible member 20B to the contact 50 as shown in FIG. 6C. A hole 57 in the lower portion of the body section 52 is formed as a result of the cutting or stamping of the peg 55.

Preferably, a portion of the fusible member 20B extends into the hole 56 of the contact 50 and below the contact 50, as shown in FIG. 6C. When the fusible member 20B is melted, the fusible material 20B' readily flows through the hole 56 and around the edges of the contact 50 such that the fusible material 20B' is deposited along the lowermost surface and the rear surface of the contact 50, as shown in FIGS. 6D and 6E. The hole 57 also allows the fusible material 20B' to readily flow to the rear surface of the contact 50.

Prior to melting the fusible member 20B, there is preferably a small gap between the bottom of the contact 50 and the pad 31 of the substrate 30 that is caused by the lowermost surface of fusible member 20B being located below the lowermost surface of the contact 50, as shown in FIG. 6C. Accordingly, this small gap promotes the flow of fusible member 20B' along the lowermost surface of the contact 50, as shown in FIG. 6E. Preferably, the small gap has a height of about 0.007" prior to the fusible member 20B being melted and a height of about 0.002" after the fusible material 20B' is re-solidified to promote capillary action of the fusible material 20B' along the lowermost surface of the contact 50. Preferably, the contact 50 is in close proximity to the pad 31 of the substrate 30 after the fusible material 20B' is re-solidified to ensure a suitable electrical connection between the contact 50 and the pad 31.

Figure 13B:
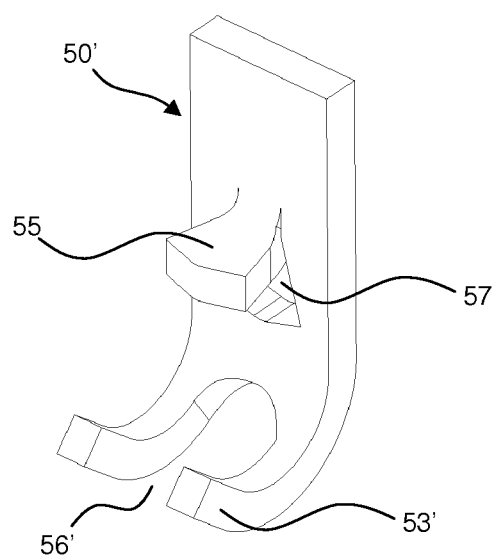
Figure 13C:
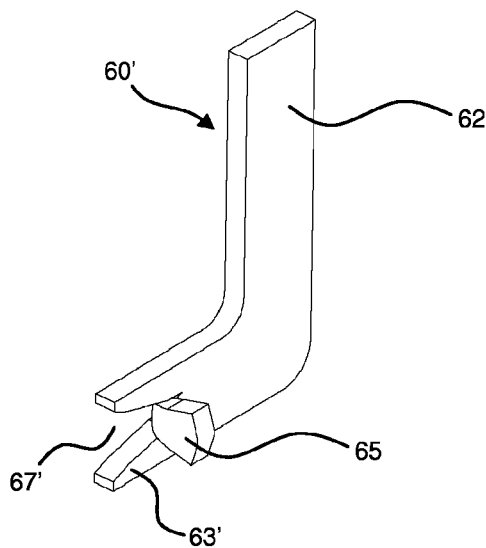

Further, according to a preferred embodiment of the present invention, the hole 56 of the contact 50 can be alternatively formed as a slot 56', as shown in FIG. 13B. The slot 56' provides an open form at the bottom of the tail section 53' of the modified contact 50', which can increase the flow of the fusible material 20B' to the lowermost surface of the contact 50'.

FIGS. 7A to 7C show a contact 60 and a fusible member 20C according to a preferred embodiment of the present invention. FIG. 7D is a cross-sectional view of the contact 60 and the fusible member 20C arranged on the substrate 30. FIGS. 7E and 7F show fusible material 20C' after being melted, flowed, and then re-solidified.

As shown in FIG. 7A, the contact 60 includes a tail section 63 extending from the bottom of a body section 62. The tail section 63 is angled with respect the body section 62. However, compared with the contact 40 shown in FIGS. 5A-5E, the tail section 62 preferably is coplanar with the body section 62. A peg 65 is cut or stamped from the tail section 63 of the contact 60 and extends perpendicular or substantially perpendicular to the tail section 63. Accordingly, when the fusible member 20C is attached to the tail section 63 of the contact 60 as shown in FIGS. 7B and 7C, the peg 65 secures the fusible member 20C to the contact 60 as shown in FIG. 7D. A hole 67 in the tail section 63 is formed as a result of the cutting or stamping of the peg 65.

As shown in FIG. 7D, the lowermost surface of fusible member 20C is located below the lowermost surface of the contact 60. Accordingly, when the fusible member 20C is melted, the fusible material 20C' readily flows along the lowermost surface of the contact 60 to provide a suitable electrical and mechanical connection between the contact 60 and the pad 31 of the substrate 30, as shown in FIGS. 7E and 7F. The hole 67 also allows the fusible material 20C' to readily flow to the rear surface of the contact 60.

As shown in FIG. 7D, prior to melting the fusible member 20C, there is preferably a small gap between the bottom of the contact 60 and the pad 31 of the substrate 30 that is caused by the lowermost surface of fusible member 20C being located below the lowermost surface of the contact 60. Accordingly, this small gap promotes the flow of fusible material 20C' along the lowermost surface of the contact 60, as shown in FIG. 7F. Preferably, the small gap has a height of about 0.007" prior to the fusible member 20C being melted and a height of about 0.002" after the fusible material 20C' is re-solidified to promote capillary action of the fusible material 20C' along the lowermost surface of the contact 60. Preferably, the contact 60 is in close proximity the pad 31 of the substrate 30 after the fusible material 20C' is re-solidified to ensure a suitable electrical connection between the contact 60 and the pad 31.

Further, according to a preferred embodiment of the present invention, the hole 67 of the contact 60 may be alternatively formed as a slot 67', as shown in FIG. 13A. The slot 67' provides an open form at the bottom of the tail section 63' of the modified contact 60', which can increase the flow of the fusible material 20C' to the rear surface of the contact 60'.

FIGS. 8A to 8C show a contact 70 and a fusible member 20D according to a preferred embodiment of the present invention. FIG. 8D is a cross-sectional view of the contact 70 and the fusible member 20D arranged on the substrate 30. FIGS. 8E and 8F show fusible material 20D' after being melted, flowed, and then re-solidified.

As shown in FIG. 8A, the contact 70 includes a tail section 73 extending from the bottom of a body section 72. The tail section 73 is angled with respect to the body section 72. As shown in FIGS. 8A, 8C, and 8E, notches 74 are cut or stamped into the tail section 73 of the contact 70. Preferably, the notches 74 are formed along the corners of the tail section 73. Accordingly, when the fusible member 20D is formed on or attached to the tail section 73 of the contact 70 as shown in FIGS. 8B and 8C, the notches 74 preferably interlock with the fusible member 20D to secure the fusible member 20D to the contact 70 as shown in FIG. 8D. Preferably, the fusible member 20D completely covers the tail section 73 of the contact 70, as shown in FIGS. 8B to 8D.

As shown in FIG. 8D, prior to melting the fusible member 20D, there is preferably a small gap between the bottom of the contact 70 and the pad 31 of the substrate 30 that is caused by the fusible member 20D extending below the bottom of the contact 70. Accordingly, this small gap promotes the flow of fusible material 20D' along the lowermost surface of the contact 70, as shown in FIG. 8F. Preferably, the small gap has a height of about 0.007" prior to the fusible member 20D being melted and a height of about 0.002" after the fusible material 20D' is re-solidified to promote capillary action of the fusible material 20D' along the lowermost surface of the contact 70. Preferably, the contact 70 is in close proximity to the pad 31 of the substrate 30 after the fusible material 20D' is re-solidified to ensure a suitable electrical connection between the contact 70 and the pad 31.

Further, as shown in FIG. 8F, fusible material 20D' interlocks with the notches 74 in the tail section 73 of the contact 70 to secure the contact 70 to the substrate 30.

FIGS. 9A and 9B show a contact 80 and a fusible member 20E according to a preferred embodiment of the present invention. FIG. 9C is a cross-sectional view of the contact 80 and the fusible member 20E arranged on the substrate 30. FIGS. 9D and 9E show fusible material 20E' after being melted, flowed, and then re-solidified.

As shown in FIG. 9A, the contact 80 includes a tail section 83 extending from the bottom of a body section 82. The tail section 83 is angled with respect to the body section 82. Preferably, the tail section 83 is perpendicular or substantially perpendicular to the body section 82. At least one peg 85 is cut or stamped from a lower portion of the body section 82 of the contact 80 and extends parallel or substantially parallel to the tail section 83 of the contact 80. Preferably, the contact 80 includes two pegs 85, for example. If more than one peg 85 is used, the pegs 85 can be aligned in the horizontal direction as shown in FIG. 9A. As shown in FIGS. 9A, 9C, and 9E, notches 84 are cut or stamped into the pegs 85 of the contact 80. Preferably, the notches 84 are formed along the corners of the pegs 85. As shown in FIGS. 9A and 9C, a hole 86 is cut or stamped from the tail section 83 of the contact 80. Slots 87 in the body section 82 are formed as a result of the cutting or stamping of the pegs 85.

Accordingly, when the fusible member 20E is attached to the contact 80 as shown in FIG. 9B, the pegs 85 secure the fusible member 20E to the contact 80 as shown in FIG. 9C. As further shown in FIG. 9C, the notches 84 preferably interlock with the fusible member 20E to secure the fusible member 20E to the contact 80.

Preferably, a portion of the fusible member 20E extends into the hole 86 of the contact 80 and below the contact 80, as shown in FIG. 9C. When the fusible member 20E is melted, the fusible material 20E' readily flows through the hole 86 and around the edges of the contact 80 such that the fusible material 20E' is deposited along the lowermost surface and the rear surface of the contact 80, as shown in FIGS. 9D and 9E. The slots 87 also allow the fusible material 20E' to readily flow to the rear surface of the contact 80. Further, as shown in FIG. 9E, the fusible material 20E' interlocks with the notches 84 in the pegs 85 of the contact 80 to secure the contact 80 to the substrate 30.

Prior to melting the fusible member 20E, there is preferably a small gap between the bottom of the contact 80 and the pad 31 of the substrate 30 that is caused by the lowermost surface of fusible member 20E being located below the lowermost surface of the contact 80, as shown in FIG. 9C. Accordingly, this small gap promotes the flow of fusible material 20E' along the lowermost surface of the contact 80, as shown in FIG. 9E. Preferably, the small gap has a height of about 0.007" prior to the fusible member 20E being melted and a height of about 0.002" after the fusible material 20E' is re-solidified to promote capillary action of the fusible material 20E' along the lowermost surface of the contact 80. Preferably, the contact 80 is in close proximity to the pad 31 of the substrate 30 after the fusible material 20E' is re-solidified to ensure a suitable electrical connection between the contact 80 and the pad 31.

Figure 13D:
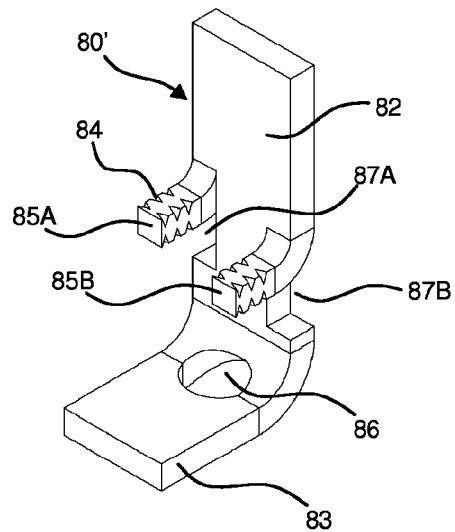
Figure 13E:
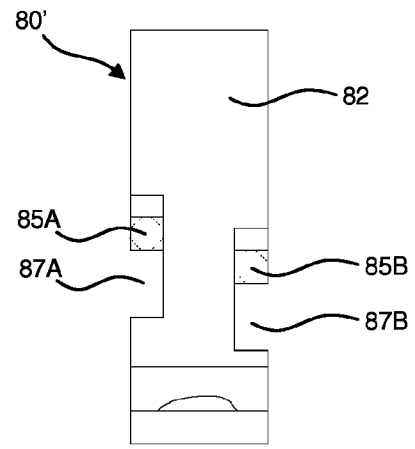
Figure 14A:
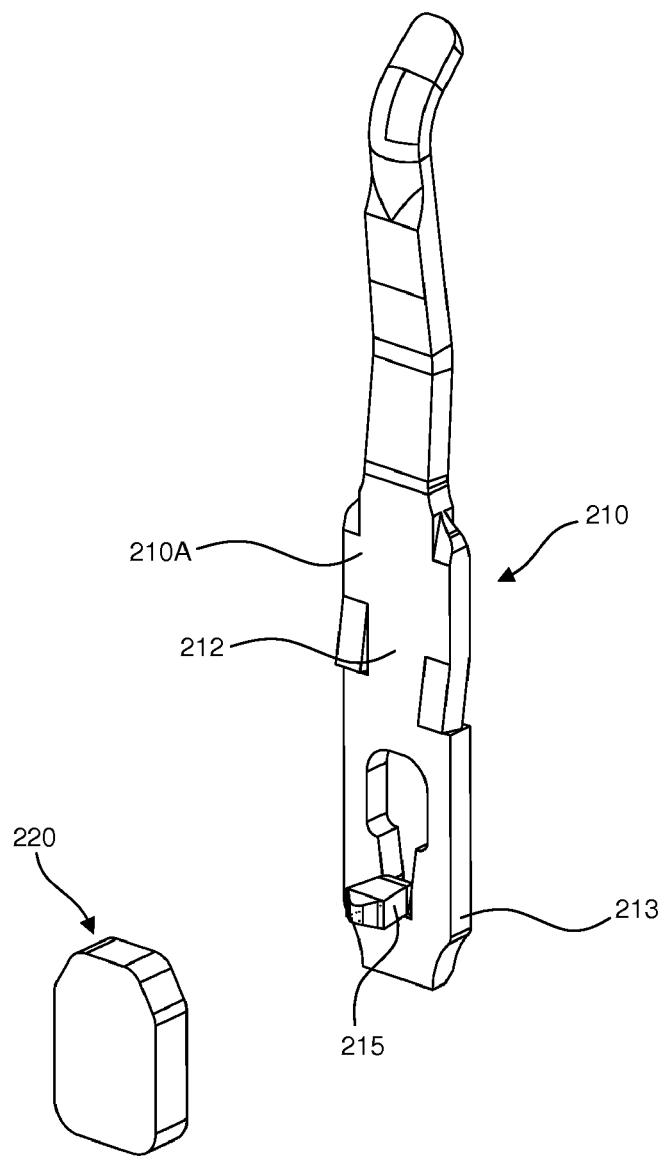
FIG. 14A is a front perspective view of a known contact and a fusible member.
Figure 14B:
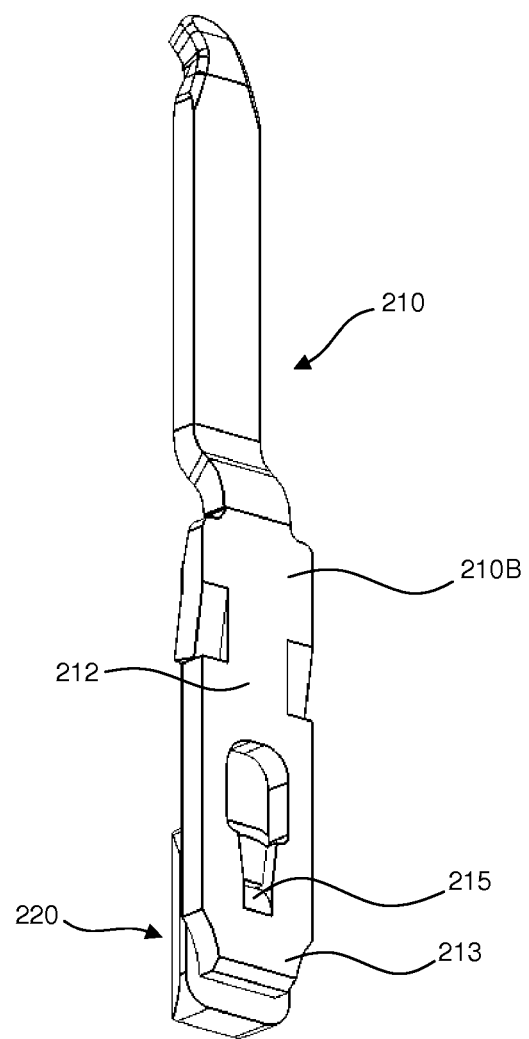
FIGS. 14B and 14C are a rear perspective view and a cross-sectional view of the fusible member of FIG. 14A attached to the contact of FIG. 14A.
Figure 14C:
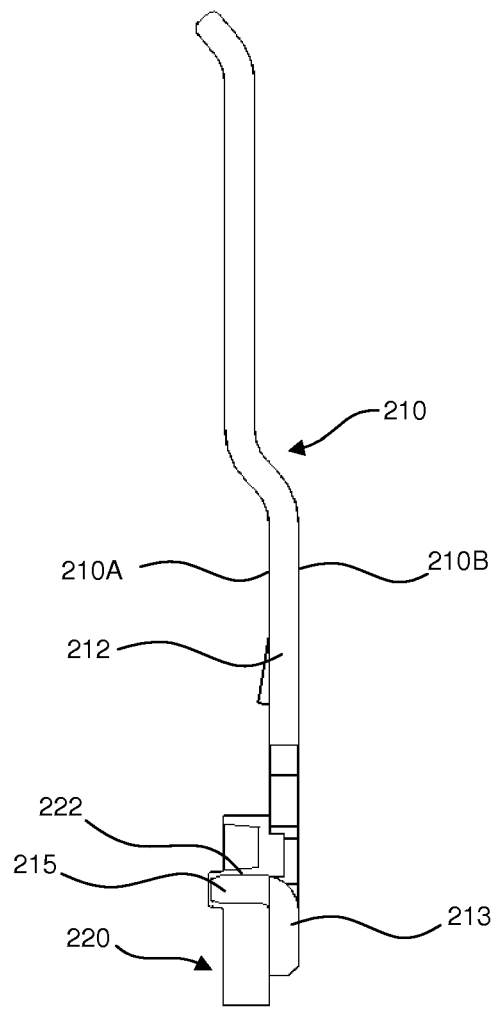

Further, according to a preferred embodiment of the present invention, the pegs 85 can be offset from each other in the horizontal direction as first and second pegs 85A and 85B, as shown in FIGS. 13D and 13E. The modified connector also includes first and second slots 87A and 87B that are offset form each other in the horizontal direction due to the offset first and second pegs 85A and 85B.

FIGS. 10A and 10B show a contact 90 and a fusible member 20F according to a preferred embodiment of the present invention. FIG. 10C is a cross-sectional view of the contact 90 and the fusible member 20F arranged on the substrate 30. FIGS. 10D and 10E show fusible material 20F' after being melted, flowed, and then re-solidified.

As shown in FIG. 10A, the contact 90 includes a tail section 93 extending from the bottom of a body section 92. As shown in FIGS. 10A and 10C, the tail section 93 is angled with respect to the body section 92. Preferably, the tail section 93 is perpendicular or substantially perpendicular to the body section 92. As shown in FIGS. 10A, 10C, and 10E, a hole 96 is cut or stamped from the tail section 93 of the contact 90. Preferably, the fusible member 20F completely covers the length of the tail section 93 that includes the hole 96. Preferably, the hole 96 has an obround shape. According to a preferred embodiment of the present invention, the hole 96 may alternatively be formed as a slot, such that the contact 90 is open at the end of the tail section 93.

As shown in FIG. 10C, prior to melting the fusible member 20F, there is preferably a small gap between the bottom of the contact 90 and the pad 31 of the substrate 30 that is caused by the fusible member 20F. Accordingly, this small gap promotes the flow of fusible material 20F' along the lowermost surface of the contact 90, as shown in FIGS. 10D and 10E. Preferably, the small gap has a height of about 0.007" prior to the fusible member 20F being melted and a height of about 0.002" after the fusible material 20F' is re-solidified to promote capillary action of the fusible material 20C' along the lowermost surface of the contact 90. Preferably, the contact 90 is in close proximity to the pad 31 of the substrate 30 after the fusible material 20F' is re-solidified to ensure a suitable electrical connection between the contact 90 and the pad 31.

FIGS. 11A to 11E show a contact 100 and a fusible member 20G according to a preferred embodiment of the present invention.

As shown in FIGS. 11A and 11B, the contact 100 includes a tail section 103 extending from the bottom of a body section 102, and a hole 107 is cut or stamped from the tail section 103. As also shown in FIGS. 11A and 11B, the fusible member 20G includes a protrusion 22G, a depression 23G, and a bottom section 24G. Preferably, the fusible member 20G is pressed or stamped so that the protrusion 22G is formed by the fusible material pressed out of the main portion of the fusible member 20G during formation of the depression 23G. However, the fusible member 20G may not include the depression 23G.

Preferably, the bottom section 24G is offset from a main portion of the fusible member 20G. The bottom section 24G is preferably offset from the main portion of the fusible member 20G after the fusible member 20G has been attached to the contact 100. Accordingly, as shown in FIG. 11E, at least a portion of the bottom section 24G of the fusible member 20G is preferably located underneath the contact 100 and intersects with a centerline C of the tail section 103 of the contact 100, where the centerline C is a vertical line through the tail section 103 equidistant or substantially equidistant from the front and rear surfaces of the contact 100. Thus, both the bottom section 24G of the fusible member 20G and the tail section 103 of the contact 100 can be located in close proximity to the center of the pad 31 of the substrate 30 (not shown).

As shown in FIG. 11C, the protrusion 22G preferably extends fully through the contact 100 when the fusible member 20G is initially attached to the contact 100. As shown in FIGS. 11D and 11E, after attaching the fusible member 20G to the contact 100, the protrusion 22G is stamped or pressed to conform to the shape of the hole 107 of the contact 100. Preferably, this results in a mushroom shaped member 22G' that secures the fusible member 20G to the contact 100.

Preferably, each of the contacts 10, 40, 50, 60, 70, 80, 90, and 100 is formed from a metal sheet. Preferably, the metal sheet includes copper, a copper alloy, a BeCu alloy, or the like as a base metal. The metal sheet preferably includes a conductive layer or layers that is/are added to the base metal, and the conductive layer or layers preferably include(s) at least one of tin, nickel, gold, silver, and the like. Each of the sections of the respective contacts 10, 40, 50, 60, 70, 80, 90, and 100 is preferably formed by punching and/or progressive die stamping. Preferably, the contacts 10, 40, 50, 60, 70, 80, 90, and 100 are formed on a ribbon for fast and cost-effective manufacturing.

The fusible members 20 and 20A-20G can be made of any fusible material and is preferably solder, in particular solder used in the manufacture of electronic equipment. Preferably, each of the fusible members 20 and 20A-20G can be cold-formed and pressed onto the corresponding contacts 10, 40, 50, 60, 70, 80, 90, and 100. Further, the bottom section 23 of the fusible member 20 is preferably offset after the fusible member 20 has been attached to the contact 10. However, according to other preferred embodiments of the present invention, each of the fusible members 20 and 20A-20G may instead be molded before attachment to the corresponding contacts 10, 40, 50, 60, 70, 80, 90, and 100. According to various preferred embodiments of the present invention, the fusible members 20 and 20A-20G may be heated to facilitate shaping.

Figure 12A:
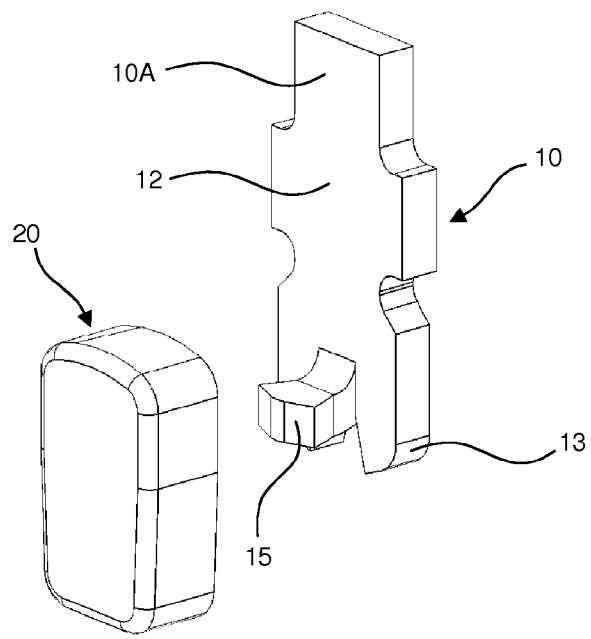
FIGS. 12A-12E show a preferred method of attaching and shaping the fusible member of FIGS. 1A and 1B to the contact of FIGS. 1A and 1B.
Figure 12B:
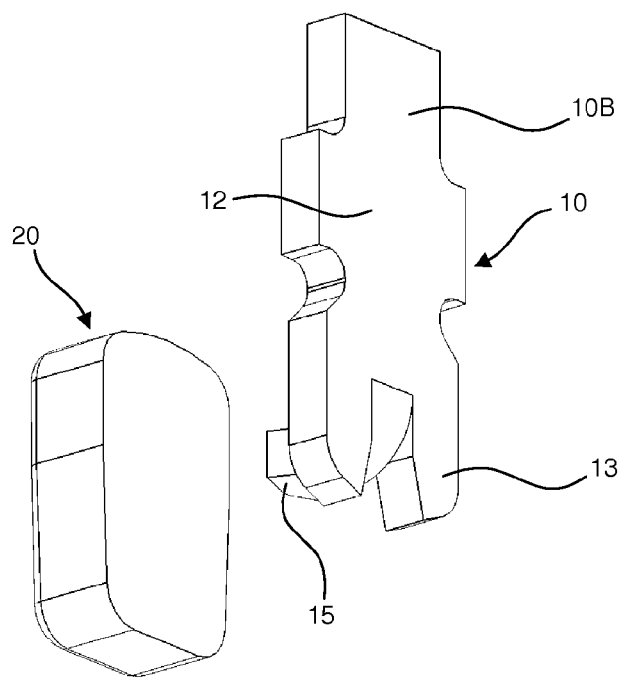
Figure 12C:
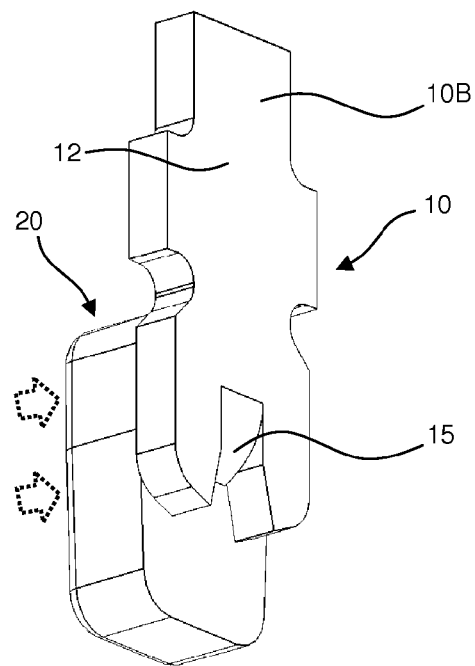
Figure 12D:
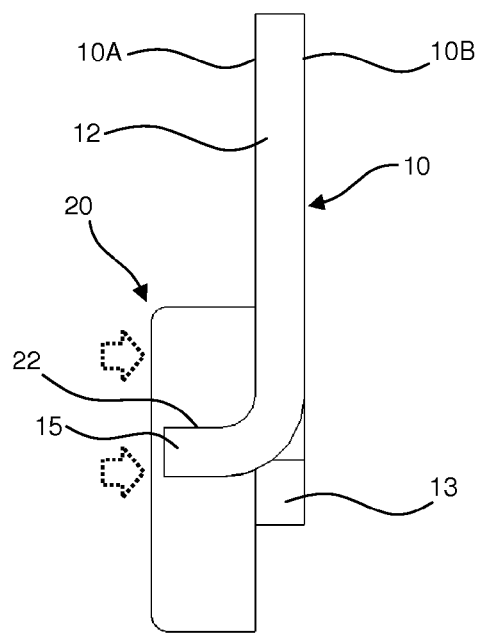
Figure 12E:
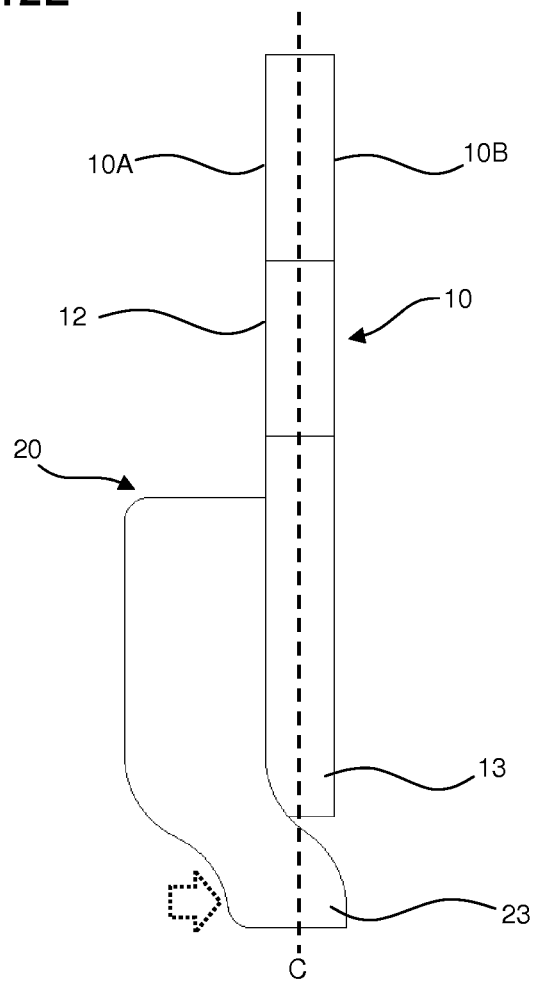

FIGS. 12A-12E show a preferred method of attaching and shaping the fusible member 20 to the contact 10. In particular, FIGS. 12A and 12B are front and rear perspective views of the fusible member 20 before being attached to the contact 10. FIGS. 12C and 12D are rear perspective and cross-sectional views showing the fusible member 20 being attached to the contact 10. FIG. 12E is a side view showing the bottom section 23 of the fusible member 20 being offset after the fusible member 20 has been attached to the contact 10.

As shown in FIGS. 12A and 12B, the fusible member 20 is arranged so that a central area of the main portion of the fusible member 20 receives the peg 15 of the contact 10. As shown in FIGS. 12C and 12D, the fusible member 20 is then pressed onto the peg 15 of the contact 10 until the main portion of the fusible member 20 abuts the front surface 10A of the contact 10. The dotted arrows shown in FIGS. 12C and 12D indicate a mechanical force that is applied to the fusible member 20 to press the fusible member 20 onto the contact 10. As shown in FIGS. 12B and 12D, the depression 22 of the fusible member 20 is preferably formed by the peg 15 penetrating into the main portion of the fusible member 20. As shown in FIG. 12E, the bottom section 23 of the fusible member 20 is preferably offset from the main portion of the fusible member 20 after the fusible member 20 has been attached to the contact 10. The dotted arrow shown in FIG. 12E indicates a mechanical force that is applied to the fusible member 20 to offset the bottom section 23.

According to the preferred embodiments of the present invention, each of the fusible members 20 and 20A-20G is preferably melted, flowed, and then re-solidified to fuse the corresponding contacts 10, 40, 50, 60, 70, 80, 90, and 100 to the pad 31 of the substrate 30. Preferably, if solder is used for the fusible members 20 and 20A-20G, then a reflow oven can be used for the re-flow soldering process, although other suitable methods may be applied, such as infrared or convection methods, for example. In the preferred embodiments of the present invention, fusible members 20 and 20A-20G are preferably connected to substrate 30, which preferably is a circuit board; however, fusible members 20 and 20A-20G could be connected to any suitable substrate, board, printed circuit board, circuit board, flex, rigid flex, flex circuit, flex film, or other structure.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A contact comprising:
a body section;
a tail section arranged at a lower portion of the body section;
a peg extending from the tail section such that the peg projects from a front surface of the contact; and
a fusible member attached to the contact such that the peg protrudes into the fusible member; wherein
a lower portion of the fusible member is offset from a main portion of the fusible member; and
a lowermost surface of the lower portion of the fusible member is located below a lowermost surface of the contact.

2. The contact according to claim 1, further comprising a slot in the tail section that is adjacent to the peg.

3. The contact according to claim 1, wherein the peg widens with increasing distance from the front surface of the contact.

4. A contact comprising:
a body section;
a tail section arranged at a lower portion of the body section;
a peg extending from the tail section such that the peg projects from a front surface of the contact; and
a fusible member attached to the contact such that the peg protrudes into the fusible member; wherein
a lower portion of the fusible member is offset from a main portion of the fusible member; and
a plane defined by the front surface of the contact intersects the lower portion of the fusible member.

5. A contact comprising:
a body section;
a tail section arranged at a lower portion of the body section;
a peg extending from the tail section such that the peg projects from a front surface of the contact; and
a fusible member attached to the contact such that the peg protrudes into the fusible member; wherein
a lower portion of the fusible member is offset from a main portion of the fusible member; and
at least a portion of a lowermost surface of the lower portion of the fusible member extends below a lowermost surface of the contact.

6. A connector system comprising:
a substrate; and
a connector connected to the substrate and including a contact; wherein
the contact includes:
a body section;
a tail section arranged at a lower portion of the body section;
a peg extending from the tail section such that the peg projects from a front surface of the contact; and
a fusible member attached to the contact such that the peg protrudes into the fusible member; wherein
a lower portion of the fusible member is offset from a main portion of the fusible member; and
a lowermost surface of the lower portion of the fusible member is located below a lowermost surface of the contact.

7. A contact comprising:
a body section;
a tail section arranged at a lower portion of the body section;
a peg extending from a front surface of the body section or a front surface of a middle portion of the tail section spaced away from an end of the tail section; and
a fusible member attached to the contact; wherein
the peg protrudes into the fusible member;
the tail section is angled with respect to the body section; and
the front surface of the tail section is coplanar or approximately coplanar with the body section.

8. The contact according to claim 7, wherein the tail section has a curved shape.

9. The contact according to claim 7, wherein:
the tail section includes a hole; and
the fusible member is arranged to at least partially extend into the hole.

10. The contact according to claim 7, wherein at least one notch is located in the peg and engages with the fusible member.

11. A connector system comprising:
a substrate; and
a connector connected to the substrate and including a contact; wherein
the contact includes:
a body section;
a tail section arranged at a lower portion of the body section;
a peg extending from a front surface of the body section or a front surface of a middle portion of the tail section spaced away from an end of the tail section; and
a fusible member attached to the contact; wherein the peg protrudes into the fusible member;
the tail section is angled with respect to the body section; and the front surface of the tail section is coplanar or approximately coplanar with the body section.

\* \* \* \* \*